(12) United States Patent
Buckley et al.

(10) Patent No.: US 8,683,077 B2
(45) Date of Patent: *Mar. 25, 2014

(54) METHOD FOR INDICATING SUPPORTED IP VERSIONS AND REACHING A DEVICE THAT SUPPORTS COMPATIBLE IP VERSIONS WITH SIP

(75) Inventors: Adrian Buckley, Tracy, CA (US); Andrew Allen, Mundelein, IL (US); John-Luc Bakker, Keller, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 706 days.

This patent is subject to a terminal disclaimer.

(21) Appl. No.: 12/145,375

(22) Filed: Jun. 24, 2008

(65) Prior Publication Data

US 2009/0319691 A1    Dec. 24, 2009

(51) Int. Cl.
*H04L 12/66* (2006.01)
(52) U.S. Cl.
USPC .......... 709/245; 370/400; 370/352; 709/227; 709/207
(58) Field of Classification Search
USPC ........................................................ 709/245
See application file for complete search history.

(56) References Cited

U.S. PATENT DOCUMENTS

| 7,142,534 B1* | 11/2006 | Whent et al. ................ 370/352 |
| 7,230,921 B2* | 6/2007 | Eriksson et al. ............. 370/230 |
| 7,676,548 B2* | 3/2010 | Oh et al. ...................... 709/208 |
| 8,331,355 B2* | 12/2012 | Buckley et al. .............. 370/352 |
| 2003/0110292 A1 | 6/2003 | Takeda et al. |
| 2004/0083291 A1* | 4/2004 | Pessi et al. .................... 709/227 |
| 2004/0088385 A1 | 5/2004 | Blanchet et al. |
| 2004/0165594 A1* | 8/2004 | Faccin et al. ................ 370/395.2 |
| 2004/0203851 A1* | 10/2004 | Vetro et al. ................. 455/456.1 |
| 2004/0204071 A1* | 10/2004 | Bahl et al. ...................... 455/557 |
| 2005/0060411 A1* | 3/2005 | Coulombe et al. ........... 709/227 |
| 2005/0066038 A1* | 3/2005 | Sakamoto et al. ........... 709/227 |
| 2005/0138166 A1* | 6/2005 | Blanchet ....................... 709/224 |
| 2005/0249238 A1* | 11/2005 | Haumont ..................... 370/466 |
| 2006/0047840 A1* | 3/2006 | Postmus ........................ 709/230 |
| 2006/0179115 A1* | 8/2006 | Garcia-Martin et al. ..... 709/217 |
| 2006/0218291 A1* | 9/2006 | Zhu et al. ...................... 709/229 |
| 2006/0239266 A1 | 10/2006 | Babbar et al. |

(Continued)

FOREIGN PATENT DOCUMENTS

| FR | 2898003 | 8/2007 |
| JP | 04108244 A | 4/1992 |

(Continued)

OTHER PUBLICATIONS

M. Baldi, F. Risso, L. Torrero, "Adding Multi-Homing and Dual-Stack Support to the Session Initiation Protocol", IEEE GLOBECOM 2007 proceedings, pp. 1890-1895, Nov. 2007.*

(Continued)

*Primary Examiner* — Andrew Goldberg
(74) *Attorney, Agent, or Firm* — Conley Rose, P.C.; J. Robert Brown, Jr.

(57) ABSTRACT

A method for conveying information related to a transport addressing scheme is provided. A user agent (UA) is also provided that is configured to convey information related to a transport addressing scheme. The UA includes a processor configured to include in a Session Initiation Protocol (SIP) message an indicator related to the transport addressing scheme.

25 Claims, 5 Drawing Sheets

(56) References Cited

U.S. PATENT DOCUMENTS

| | | | |
|---|---|---|---|
| 2006/0259641 | A1 | 11/2006 | Kim et al. |
| 2006/0270404 | A1* | 11/2006 | Tuohino et al. ............ 455/432.3 |
| 2007/0076729 | A1* | 4/2007 | Takeda .......................... 370/401 |
| 2007/0168440 | A1* | 7/2007 | Cobelens ...................... 709/207 |
| 2007/0195755 | A1* | 8/2007 | Li et al. ......................... 370/352 |
| 2008/0075114 | A1 | 3/2008 | Mo |
| 2008/0104678 | A1 | 5/2008 | Hsu |
| 2008/0244102 | A1* | 10/2008 | Mochizuki ....................... 710/9 |
| 2008/0273520 | A1* | 11/2008 | Kim et al. ..................... 370/345 |
| 2009/0041034 | A1* | 2/2009 | Boucadair et al. ............ 370/400 |
| 2009/0144429 | A1* | 6/2009 | Astrom ......................... 709/227 |
| 2009/0248800 | A1* | 10/2009 | Chu et al. ...................... 709/204 |
| 2009/0279536 | A1* | 11/2009 | Unbehagen et al. .......... 370/352 |
| 2009/0316684 | A1* | 12/2009 | Buckley et al. ............... 370/352 |

FOREIGN PATENT DOCUMENTS

| | | | |
|---|---|---|---|
| JP | 2001197561 | A | 7/2001 |
| JP | 2002374573 | A | 12/2002 |
| JP | 2004260314 | A | 9/2004 |
| JP | 2005086467 | A | 3/2005 |
| JP | 2005286760 | A | 10/2005 |
| JP | 2007312123 | A | 11/2007 |
| JP | 2008042460 | A | 2/2008 |
| JP | 2009071754 | A | 4/2009 |
| JP | 2009528742 | A | 8/2009 |
| KR | 20080015804 | A | 2/2008 |
| WO | 2007099248 | A2 | 9/2007 |

OTHER PUBLICATIONS

Cadair et al., WO 2007/099248 A2, Sep. 7, 2007.*
Camarillo, G., et al.; The Alternative Network Address Types (ANAT) Semantics for the Description Protocol (SDP) Grouping Framework; Network Working Group RFC 4091; Jun. 2005; 7 pgs.
Camarillo, G., et al.; Usage of the Session Description Protocol (SDP) Alternative Network Address Types (ANAT) Semantics in the Session Initiation Protocol (SIP); Network Working Group; RFC 4092; Jun. 2005; 6 pgs.
Mulahusic, J., et al.; SIP Issues in Dual-stack Environments; draft-persson-sipping-sip-issues-dual-stack-00.txt; SIPPING Working Group; Feb. 2003; 9 pgs.
Kawarasaki, Yasuro, et al.; IPv4/IPv6 SIP Interworking Methods in Dual-Stack Network; NTT Corporation; 2003, pp. 1124-1128.
Soininen, J.; Transition Scenarios for 3GPP Networks; draft-soininen-v6ops-3gpp-cases-00.txt; Sep. 2002; 11 pgs.
PCT International Search Report; PCT Application No. PCT/US2008/068750; Mar. 18, 2009; 4 pgs.
PCT Written Opinion of the International Searching Authority; PCT Application No. PCT/US2008/068750; Mar. 18, 2009; 7 pgs.
PCT International Search Report; PCT Application No. PCT/US2008/068752; Mar. 18, 2009; 4 pgs.
PCT Written Opinion of the International Searching Authority; PCT Application No. PCT/US2008/068752; Mar. 18, 2009; 6 pgs.
3GPP TSG CT WG1 Meeting #53; Title: "Different IP Addresses"; Alcatel-Lucent; Cape Town, South Africa; C1-081945; May 5-9, 2008; 14 pgs.
3GPP TSG CT WG1 Meeting #51; Title: "Dual IP-stack UE"; Alcatel-Lucent, Nortel, Qualcomm; Puerto Vallarta, Mexico; C1-080004; Jan. 28-Feb. 1, 2008; 12 pgs.
Boucadair, Mohamed, et al.; Title: "Towards Smooth Introduction of IPv6 in SIP-based Architectures"; IEEE Computer Society; 32nd IEEE Conference on Local Computer Networks; 2007; 2 pgs.
Buckley, Adrian, et al.; Title: "Method for a Network Component to Route a Communication Session"; U.S. Appl. No. 12/145,385, filed Jun. 24, 2008; Specification 32 pgs.; 5 Drawing Sheets (Figs. 1-6).
Office Action dated Sep. 29, 2011; 19 pages; U.S. Appl. No. 12/145,385, filed Jun. 24, 2008.
Chinese Office Action; Application No. 20880130045.3; Jan. 5, 2013; 11 pages.

Japanese Office Action; Application No. 2011-516253; Feb. 25, 2013; 8 pages.
Chinese Office Action; Application No. 200880130052.3; Jan. 5, 2013; 16 pages.
Japanese Office Action; Application No. 2011-516254; Feb. 26, 2013; 8 pages.
Final Office Action dated May 1, 2012; U.S. Appl. No. 12/145,385, filed Jun. 24, 2008; 15 pages.
Canadian Office Action; Application No. 2,728,209; May 31, 2012; 3 pages.
Korean Office Action; Application No. 10-2010-7028851; Jun. 18, 2012; 10 pages.
Notice of Allowance dated Aug. 9, 2012; U.S. Appl. No. 12/145,385, filed Jun. 24, 2008; 15 pages.
Korean Office Action; Application No. 10-2010-7029448; Jun. 25, 2012; 8 pages.
Canadian Office Action; Application No. 2,728,222; Oct. 16, 2012; 3 pages.
Boucadair, Mohamed, et al.; "Migrating SIP-based Conversational Services to IPv6: Complications and Interworking with IPv4"; Second International Conference on Digital Telecommunications (ICDT '07); Jul. 2007; 6 pages.
3GPP TSG CT WG1 Meeting #53; "Different IP Address"; C1-081526; Cape Town, South Africa; May 5-9, 2008; 12 pages.
3GPP TSG SA WG2 Meeting #63; "LS on Simultaneous Usage of IPv4 and IPv6 in IMS"; S2-081230; Athens, Greece, Feb. 18-22, 2008; 2 pages.
3GPP TSG SA WG2 Meeting #63; "Draft Reply LS on Simultaneous Usage of IPv4 and IPv6 in IMS"; S2-081299; Athens, Greece, Feb. 18-22, 2008; 2 pages.
Rosenberg, J.; "Interactive Connectivity Establishment (ICE): A Methodology for Network Address Translator (NAT) Traversal for Multimedia Session Establishment Protocols"; draft-ietf-mmusic-ice-04; Feb. 21, 2005; 46 pages.
Camarillo, G., et al.; "The SDP (Session Description Protocol) Grouping Framework"; draft-ietf-mmusic-rfc3388bis-01.txt; Jul. 7, 2008; 21 pages.
Camarillo, G., et al.; "Grouping of Media Lines in the Session Description Protocol (SDP)"; RFC: 3388; Dec. 2002; 21 pages.
European Examination Report; Application No. 08796049.8; Jun. 12, 2013; 10 pages.
Chinese Office Action; Application No. 200880130052.3; Jun. 28, 2013; 13 pages.
European Examination Report; Application No. 08796050.6; Jun. 12, 2013; 7 pages.
Chinese Office Action; Application No. 20880130045.3; Sep. 18, 2013; 11 pages.
European Examination Report; Application No. 08796050.6; Jun. 12, 2013; 8 pages.
Nasuno, Youichi; "IP Network Enhanced By A Router", NIKKEI Network; No. 59; Nikkei Business Publications; Mar. 2005; 8 pages (No English translation available; Referenced and described in the Japanese Office Action date Nov. 27, 2013 from co-pending Japanese Application No. 2011-516253, which is also herein.).
Kawai, Yasuhiro; "Notable Internet Technology"; Nikkei Internet Technology; No. 53; Nikkei Business Publications; Dec. 2001; 4 pages. (No English translation available; Referenced and described in the Japanese Office Action date Nov. 27, 2013 from co-pending Japanese Application No. 2011-516253, which is also cited herein.).
Yamada, Takeshi; Proceedings of the 2003 IEICE Communications Society Conference; vol. 2. (No English translation available; Referenced and described in the Japanese Office Action dated Nov. 27, 2013 from co-pending Japanese Application No. 2011-516253 which is also cited herein.).
Canadian Office Action; Application No. 2,728,222; Nov. 7, 2013; 3 pages.
Japanese Office Action; Application No. 2011-516253; Nov. 27, 2013; 9 pages.
Chinese Office Action; Application No. 200880130052.3; Dec. 18, 2013; 14 pages.

* cited by examiner

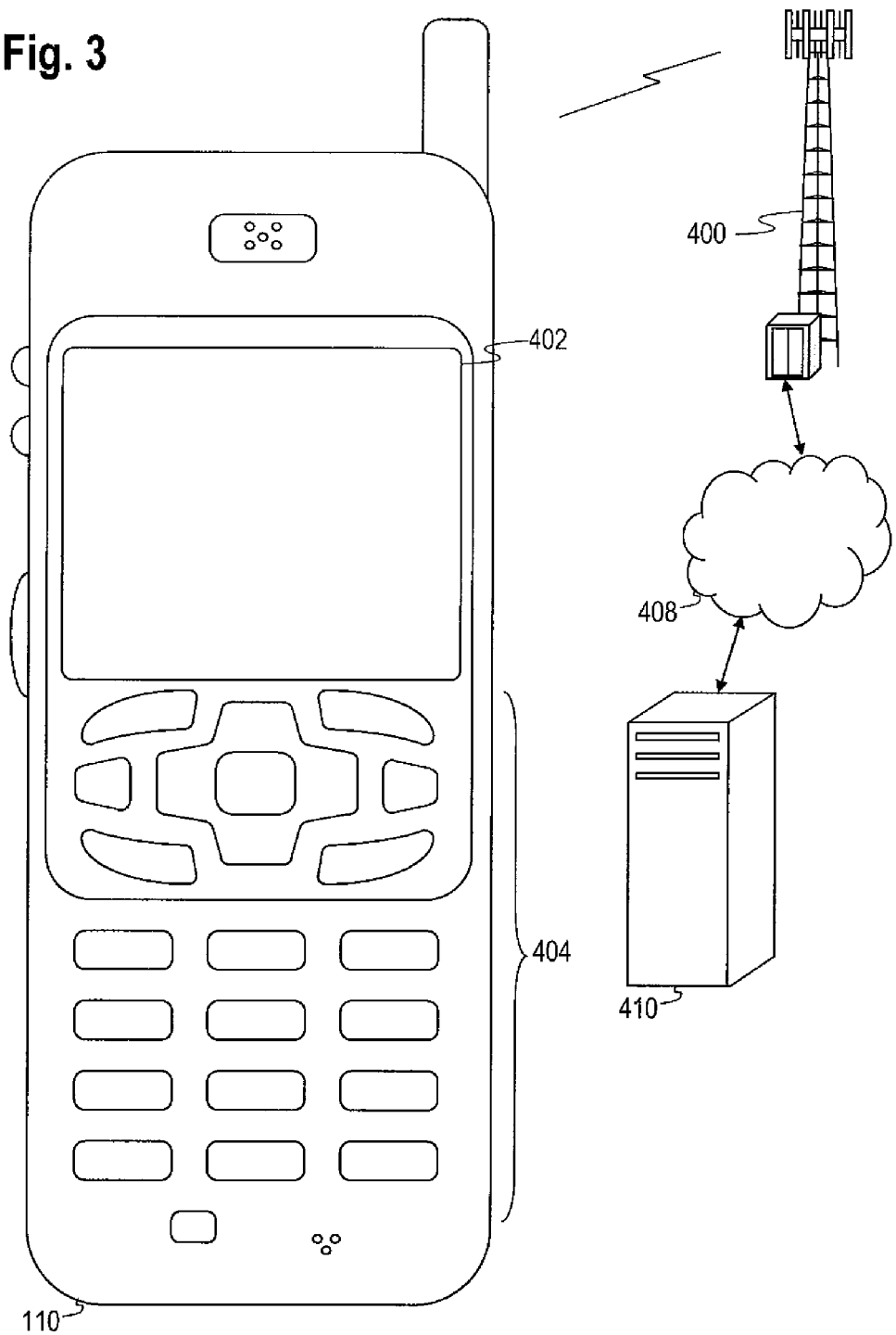

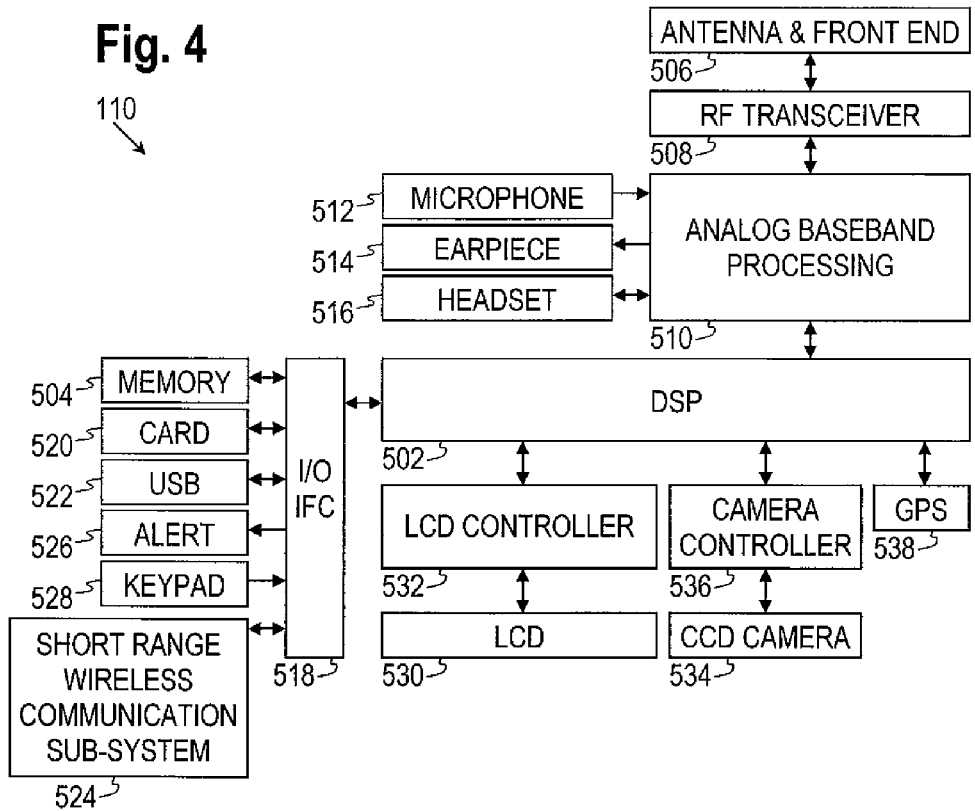
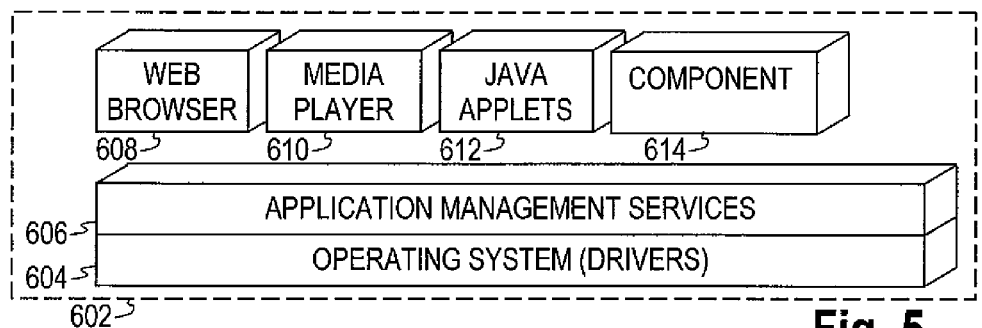

METHOD FOR INDICATING SUPPORTED IP VERSIONS AND REACHING A DEVICE THAT SUPPORTS COMPATIBLE IP VERSIONS WITH SIP

BACKGROUND

The IP (Internet Protocol) Multimedia Subsystem (IMS) is a standardized architecture for providing multimedia services and voice-over-IP calls to both mobile and fixed user agents (UAs). The Session Initiation Protocol (SIP) been standardized and governed primarily by the Internet Engineering Task Force (IETF) as a protocol for setting up and managing IMS-based calls. As used herein, the terms "user agent" and "UA" can refer to but are not limited to mobile devices such as mobile telephones, personal digital assistants, handheld or laptop computers, network nodes, and similar devices, etc., that have telecommunications capabilities. Such a UA might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UA" may also refer to devices that have similar capabilities but that are not transportable, such as fixed line telephones, desktop computers, set-top boxes, or network nodes. When a UA is a network node, the network node could act on behalf of another function such as a wireless device or a fixed line device and simulate or emulate the wireless device or fixed line device. For example, for some wireless devices, the IMS SIP client that would typically reside on the device actually resides in the network and relays SIP message information to the device using optimized protocols. In other words, some functions that were traditionally carried out by a wireless device can be distributed in the form of a remote UA, where the remote UA represents the wireless device in the network. The term "UA" can also refer to any hardware or software component that can terminate a SIP session.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a diagram of a wireless communications system including a UA configured for some of the various embodiments of the disclosure.

FIG. 4 is a block diagram of a UA configured for some of the various embodiments of the disclosure.

FIG. 5 is a diagram of a software environment that may be implemented on a UA configured for some of the various embodiments of the disclosure.

DETAILED DESCRIPTION

Figure 1:
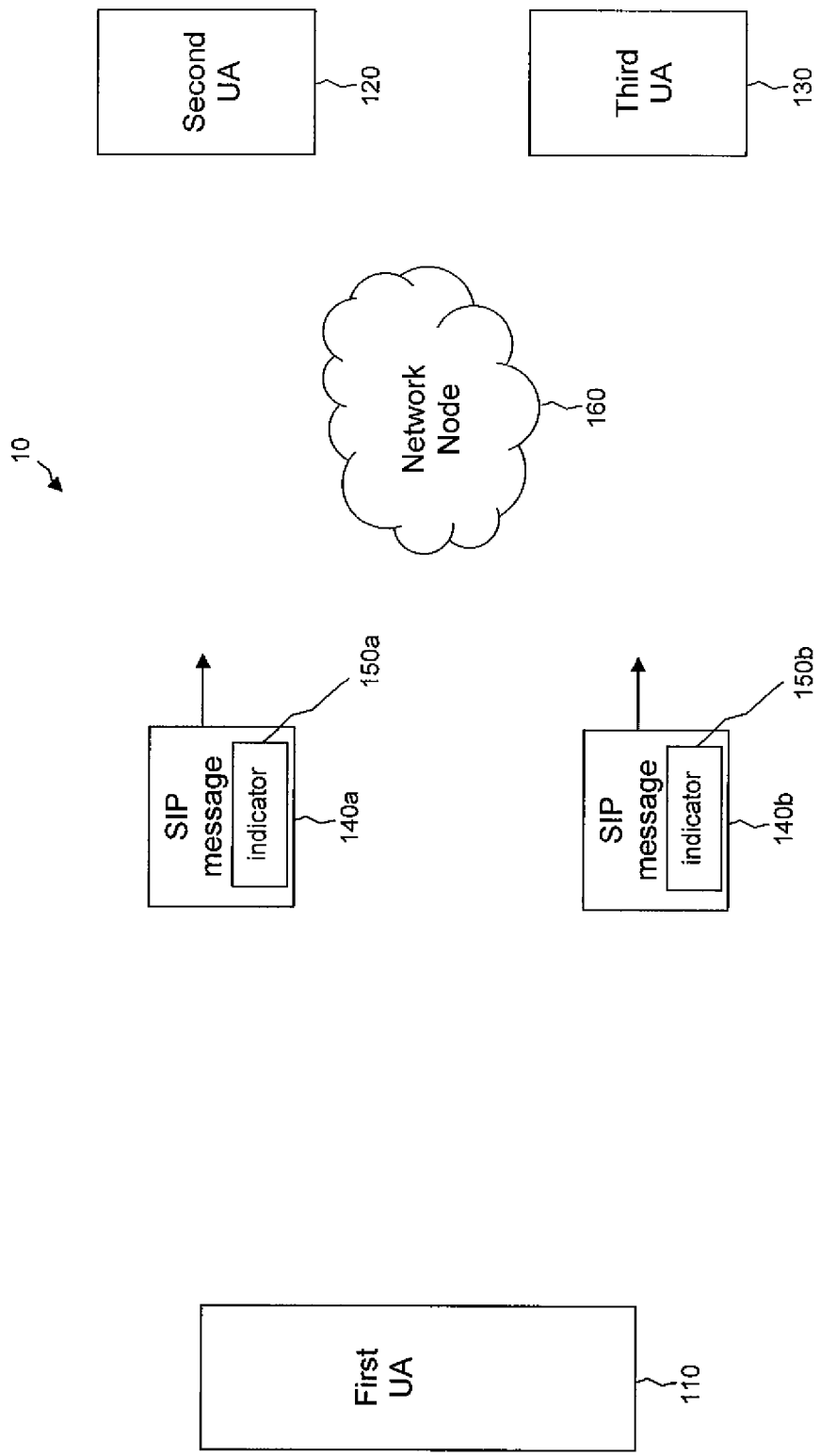
FIG. 1 is a diagram of a portion of an IMS architecture according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method is provided for conveying information related to a transport addressing scheme. The method provides for including in a Session Initiation Protocol (SIP) message an indicator related to simultaneous support of multiple transport addressing schemes.

In an alternative embodiment, a user agent (UA) is provided that is configured to convey information related to a transport addressing scheme. The UA includes a processor configured to include in a Session Initiation Protocol (SIP) message an indicator related to simultaneous support of multiple transport addressing schemes.

The Third Generation Partnership Project (3GPP) has standardized the IP Multimedia Subsystem (IMS) as a next generation SIP/IP based network for multimedia services for mobile and landline networks. SIP and IMS are based on the Internet Protocol (IP), which uses IP addresses to designate a UA to which a message should be sent. Other transport addressing schemes could exist under other protocols, but the terms "IP address", "IP version", and the like will be used herein to refer to any transport addressing scheme. There are currently two kinds of IP addresses: IPv4 addresses and IPv6 addresses. Some UAs support only IPv4, others only IPv6, and others both IPv4 and IPv6 (so-called dual stack UAs). Of the dual stack UAs, some can use only IPv4 or only IPv6 at any one time. Other dual stack UAs support the capability to use IPv4 and IPv6 simultaneously during the same communication, such as during the same SIP session. For example, IPv6 might be used for signaling at that same time that IPv4 is being used for media traffic, or vice versa.

The two IP address versions are not directly compatible, so some kind of address translation is typically needed when a message is sent from a UA that uses only one version to a UA that uses only the other version, or between other systems or components in the network. Such translation might be carried out by an Address Translation Gateway, or a similar component, placed in the network such that both IPv4 and IPv6 messages pass through the translation component. Messages between two IPv4-only UAs, between two IPv6-only UAs, or between two dual stack UAs would not be routed to the translation component or perhaps could pass through the translation component without translation. The translation component would perform the appropriate translation for messages between an IPv4-only UA and an IPv6-only UA.

Routing messages through the translation component regardless of whether or not translation of the messages is needed could cause unnecessary delays in the transmission of messages for which no translation is needed. This can be especially critical for delay-sensitive IP traffic such as Voice over IP (VoIP) calls.

Some of these delays can be avoided by requiring that an IMS SIP proxy component (such as a serving call session control function (S-CSCF)) be able to determine whether a UA supports either IPv4 or IPv6 addresses. If a UA is such a dual stack UA, the proxy component can avoid routing the UA's messages via the address translation component. This can promote an optimal route for the UA's messages and can avoid the additional delay that routing via the address translation component would impose.

The proxy component might determine whether a UA is a dual stack UA based on the type of network access technology indicated in the SIP P-Access-Network-Info header. That is, some networks might specify that only dual stack UAs can use those networks, and when such a network is indicated in the P-Access-Network-Info header, an assumption can be made that the UAs in that network are dual stack UAs. The proxy component, upon reading such a header, would know that UAs in the network can use either IPv4 or IPv6 and that messages transmitted within the network do not need to be routed through a translation component.

While following such proposals might eliminate the routing of messages through the translation component in networks that require dual stack UAs, there may be other networks that support, but do not necessarily require, that all devices be dual stack devices. Furthermore, such networks cannot assume that a given device is a dual stack UA that supports simultaneous use of IPv4 and IPv6 addresses. Thus, the proxy component might be unaware that dual stack UAs are supported in such a network and, to be safe, might route messages through the translation component even when translation would not be necessary and the routing of messages through the translation component could be eliminated.

For example, an IMS network might require that the UAs in the network use IPv6 for signaling. If such an IPv6-based UA is communicating with an IPv4-based UA, the media portions of the communications from the IPv6-based UA might need to pass through a translation gateway so that the IPv4-based UA can properly receive and understand the media portions.

Also, there are so-called dual mode UAs that support multiple access networks and that may move between access networks of different types. For example, a UA might support both a Code Division Multiple Access (CDMA) IS-2000 (commonly referred to as CDMA 1x) access network and a Global System for Mobile Communications (GSM)/General Packet Radio Service (GPRS) access network. With the existence of dual mode UAs, networks may not be able to reliably assume what the transport addressing scheme capabilities of a UA are. If such a UA moved from a network that required dual stack UAs to a network that supported, but did not require, dual stack UAs, the proxy component might route messages through the translation component, even though routing through the translation component would not be necessary. Therefore, a linkage between the type of network access technology and the type of support for transport addressing schemes is a less than desirable technique for determining whether a message needs to be routed through an address translation component.

In various embodiments, a mechanism is provided that enables a SIP UA to indicate to the network and to other UAs the IP versions and/or IP version combinations the SIP UA supports, enables the SIP UA to discover what IP version and/or IP version combinations another SIP UA uses, and enables the SIP UA to indicate a preference or requirement for an IP version or IP version combination that another SIP UA should support.

Internet Engineering Task Force (IETF) Request for Comments (RFC) 3840 defines a mechanism in SIP for a UA to indicate its capabilities to the network and to other UAs. In one embodiment, a new media feature tag as per RFC 3840 is defined. One example of the media feature tag name could be "sip.ip-versions" but other syntaxes and encodings are possible. The sip.ip-versions media feature tag can indicate whether a communications device supports IPv4 for both signaling and media, IPv6 for both signaling and media, IPv6 for signaling and ipv4 for media simultaneously, or IPv4 for signaling and IPv6 for media simultaneously. In some embodiments, the feature tags or other indicators might indicate only a single transport addressing scheme, rather than indicating a single IP version for both signaling and media, or rather than indicating simultaneous use of different IP versions, one for signaling and one for media.

A plurality of tokens/tags/identifiers/indicators can be defined, each indicating an IP version and possibly also indicating whether an IP version applies only to signaling or only to media. When one or more of the tokens/tags/identifiers/indicators are associated with the sip.ip-versions media feature tag, the supported IP versions and/or version combinations for a UA can be specified. Typical values for the tokens/tags/identifiers/indicators might include "ipv4", indicating that a UA can support IPv4 addresses for both signaling and media; "ipv6", indicating that a UA can support IPv6 addresses for both signaling and media; "ipv4s-ipv6m", indicating that a UA can support both IPv4 and IPv6 addresses but can only use the IPv4 address for signaling and the IPv6 address for media; and "ipv6s-ipv4m", indicating that a UA can support both IPv4 and IPv6 addresses but can only use the IPv6 address for signaling and the IPv4 address for media.

Values appropriate for use with this feature tag might include a tokens/tag/identifier/indicator with an equality relationship. For example, a UA that only supports IPv4 might be designated by:

+sip.ip-versions="ipv4".

A UA that supports IPv4 and IPv6 but can only support SIP sessions where signaling and media use the same version might be designated by:

+sip.ip-versions="ipv4, ipv6"

A UA that supports IPv4 and IPv6 as well as supporting SIP sessions where signaling and media use the same version and that can also support IPv6 for signaling and IPv4 for media simultaneously but cannot support IPv4 for signaling and IPv6 for media simultaneously might be designated by:

+sip.ip-versions="ipv4, ipv6, ipv6s-ipv4m"

A UA that supports IPv4 and IPv6 as well as supporting SIP sessions where signaling and media use the same version and that can also support IPv6 for signaling and IPv4 for media simultaneously and IPv4 for signaling and IPv6 for media simultaneously might be designated by tokens/tags/identifiers/indicators as indicated in the following table:

|  | Both | Media | Signaling |
| --- | --- | --- | --- |
| IPv4 | Tag1 | Tag2 | Tag3 |
| IPv6 | Tag4 | Tag5 | Tag6 |

The tokens/tags/identifiers/indicators could be further extended to identify the IP version over a specific access network such as DSL (digital subscriber line), WiFi (wireless fidelity), GERAN (global system for mobile communication edge radio access network), UTRAN (universal mobile telecommunications system terrestrial radio access network), LTE (long term evolution), CDMA2000 (code division multiple access), WiMax (worldwide interoperability for microwave access), or others. This would increase the number of possible tag values. For example, a UA that supports both GERAN and DSL might be designated by tags as indicated in the following tables:

| GERAN | Both | Media | Signaling |
|-------|------|-------|-----------|
| IPv4  | Tag1 | Tag2  | Tag3      |
| IPv6  | Tag4 | Tag5  | Tag6      |

| DSL  | Both  | Media | Signaling |
|------|-------|-------|-----------|
| IPv4 | Tag7  | Tag8  | Tag9      |
| IPv6 | Tag10 | Tag11 | Tag12     |

The UA can include the sip.ip-versions media feature tag in the Contact header of SIP REGISTER requests and other initial SIP Requests such as SIP INVITE as specified in RFC 3840. For example, a UA can advertise in the SIP Contact header that it can support multiple IP versions simultaneously.

By examining the Contact header in a SIP request, a proxy component (such as the S-CSCF) can determine what IP version capabilities and combinations a UA supports. Based upon the capabilities and combinations listed in the sip.ip-versions media feature tag, the S-CSCF can take actions such as determining if the signaling portion and/or the media portion of the session is routed through a translation gateway when interoperating with another domain. If the UA's capabilities change, such as but not limited to moving from an access network where the UA was allowed to use one form of transport addressing to an access network where the UA can use either new transport addressing or a combination of the new and old, the UA can signal, via the mechanisms above, its addressing capabilities.

A UA can discover the IP versions supported by another UA by sending a SIP OPTIONS request as specified in RFC 3261. When responding to a SIP OPTIONS request, a UA can include a Contact header containing the +sip.ip-versions media feature tag that indicates the IP version capabilities and combinations supported by the UA.

IETF RFC 3841 defines a mechanism that allows a UA to indicate a preference or requirement to reach a UA that supports a certain capability. Using the Accept-Contact header and Reject-Contact header and mechanisms defined in RFC 3841, a UA can express a preference to route to another UA that supports particular IP version capabilities and combinations.

For example, a UA that supports only IPv4 may prefer to reach the UA of another user that supports IPv4 for both signaling and media in order to avoid the need for a translation function. To do this, the UA can include in a SIP INVITE an Accept-Contact header containing the feature tag +sip.ip-versions="ipv4". For example:

Accept-Contact: *;+sip.ip-versions="ipv4"

SIP and IMS support the capability to register multiple UAs that are addressable using the same SIP URI or Public User Identity. UAs that share the same SIP URI or Public User Identity may have different capabilities including different IP address versions and the abilities to support different combinations of different IP address versions. The S-CSCF that serves a user targeted by a SIP INVITE request containing an Accept-Contact header that contains the feature tag +sip.ip-version="ipv4" will, in the case where multiple UAs are registered for the user, preferentially route the SIP INVITE request to the UA that has registered with a +sip.ip-version="ipv4" in the Contact header of the SIP REGISTER request. The Accept-Contact header can follow the specifications of RFC 3841.

Similarly, the S-CSCF that serves a user targeted by a SIP INVITE request containing an Accept-Contact header that contains the feature tag +sip.ip-version="ipv6" will, in the case where multiple UAs are registered for the user, preferentially route the SIP INVITE request to the UA that has registered with a +sip.ip-version="ipv6" in the Contact header of the SIP REGISTER request. The Accept-Contact header can follow the specifications of RFC 3841.

Similarly, the S-CSCF that serves a user targeted by a SIP INVITE request containing an Accept-Contact header that contains the feature tag +sip.ip-version="ipv4s-ipv6m" will, in the case where multiple UAs are registered for the user, preferentially route the SIP INVITE request to the UA that has registered with a +sip.ip-version="ipv4s-ipv6m" in the Contact header of the SIP REGISTER request. The Accept-Contact header can follow the specifications of RFC 3841.

Similarly, the S-CSCF that serves a user targeted by a SIP INVITE request containing an Accept-Contact header that contains the feature tag +sip.ip-version="ipv6s-ipv4m" will, in the case where multiple UAs are registered for the user, preferentially route the SIP INVITE request to the UA that has registered with a +sip.ip-version="ipv6s-ipv4m" in the Contact header of the SIP REGISTER request. The Accept-Contact header can follow the specifications of RFC 3841.

In an alternative embodiment, a SIP message can contain a SIP header field (such as, but not limited to, a P-Header value defined according to the process defined in RFC 3427) that identifies the IP versions supported or originally used by the device. The header could be constructed in several different ways. For example, a single SIP header field could contain one or more tags as described above, there could be a single SIP header field per access type, or there could be one SIP header field for media and another for control signaling. The SIP header field could be included by the SIP UA or could be added by a proxy such as, but not limited to, a proxy CSCF (P-CSCF).

In an alternative embodiment, a SIP message can contain an XML body that describes the IP capabilities of the device. The XML body could contain tags that describe IPv4 only, IPv4 media only, IPv4 control only, IPV6 only, IPv6 media only, and/or IPv6 control only.

Possibly, the XML body could be of the existing media type "application/3gpp-ims+xml" (see 3rd Generation Partnership Project (3GPP) Technical Specification (TS) 24.229). Alternatively, a new media type and corresponding XML schema could be allocated. The content-disposition header value could be 3gpp-alternative-service or 3gpp-service-info or a new value. A default content-disposition header value for the new media type might have to be allocated.

In the example below, three different XML structures are presented: tSupportedIP, eSupportedIP and ISupportedIP. One of the three can be referenced from either the new XML Schema or the XML Schema known as "application/3gpp-ims+xml". Of course, other XML schema representations, such as DTD or Relax NG can also be created with substantially the same information. In addition, hooks for possible future extension (i.e., allowed by statements such as <xs:anyAttribute/> or <xs:any namespace="##any" processContents="lax" minOccurs="0" maxOccurs="unbounded"/>) can also be included. The XML structures (such as tSupportedIP, eSupportedIP and ISupportedIP) could either become an element, element content or attribute in the new XML schema or XML Schema known as "application/3gpp-ims+xml". In addition, it would be possible using lSupportedIP to list zero or more preferences, indicating a relative order or preference. E.g., the first entry would be preferred over any additional entry, e.g., in <supportedIP>IPV6-only IPv4-only</supportedIP> where "IPV6-only" is preferred and "IPv4-only" an alternative. XML schema encoding the IP capabilities of the device could further constrain and require minimally 1 IP capability listed. Another constraint could be that no IP capability is mentioned more than once. It could even be possible to constrain that some capabilities do not occur in conjunction with each other.

```
<xs:complexType name="tSupportedIP">
    <xs:choice>
        <xs:element name="IPv4-only" minOccurs="0">
            <xs:complexType/>
        </xs:element>
        <xs:element name="IPv4-media-only" minOccurs="0">
            <xs:complexType/>
        </xs:element>
        <xs:element name="IPv4-control-only" minOccurs="0">
            <xs:complexType/>
        </xs:element>
        <xs:element name="IPv6-only" minOccurs="0">
            <xs:complexType/>
        </xs:element>
        <xs:element name="IPv6-media-only" minOccurs="0">
```

```
            <xs:complexType/>
        </xs:element>
        <xs:element name="IPv6-control-only" minOccurs="0">
            <xs:complexType/>
        </xs:element>
    </xs:choice>
</xs:complexType>
<xs:simpleType name="eSupportedIP">
    <xs:restriction base="xs:string">
        <xs:enumeration value="IPv4-only"/>
        <xs:enumeration value="IPv4-media-only"/>
        <xs:enumeration value="IPv4-control-only"/>
        <xs:enumeration value="IPv6-only"/>
        <xs:enumeration value="IPv6-media-only"/>
        <xs:enumeration value="IPv6-control-only"/>
    </xs:restriction>
</xs:simpleType>
<xs:simpleType name="lSupportedIP">
    <xs:list itemType="eSupportedIP"/>
</xs:simpleType>
```

An example enhancement of 3GPP TS 24.229 is given below.

<Start Specification Enhancement>

7.6.2 Document Type Definition

The XML Schema, according to XML syntax definitions, is defined in table 7.7A.

TABLE 7.7A

IM CN subsystem XML body, XML Schema

```
<?xml version="1.0" encoding="UTF-8"?>
<xs:schema xmlns:xs="http://www.w3.org/2001/XMLSchema" elementFormDefault="qualified"
attributeFormDefault="unqualified" version="1">
    <xs:complexType name="tIMS3GPP">
        <xs:sequence>
            <xs:choice>
                <xs:element name="alternative-service" type="tAlternativeService"/>
                <xs:element name="service-info" type="xs:string"/>
            </xs:choice>
            <xs:any namespace="##any" processContents="lax" minOccurs="0"
maxOccurs="unbounded"/>
        </xs:sequence>
        <xs:attribute name="version" type="xs:decimal" use="required"/>
        <xs:anyAttribute/>
    </xs:complexType>
    <xs:complexType name="tAlternativeService">
        <xs:sequence>
            <xs:element name="type" type="tType"/>
            <xs:element name="reason" type="xs:string"/>
            <xs:element name="action" type="tAction" minOccurs="0"/>
            <xs:any namespace="##any" processContents="lax" minOccurs="0"
maxOccurs="unbounded"/>
        </xs:sequence>
    </xs:complexType>
    <xs:complexType name="tType">
        <xs:sequence>
            <xs:element name="emergency" minOccurs="0" maxOccurs="1">
                <xs:complexType/>
            </xs:element>
            <xs:any namespace="##any" processContents="lax" minOccurs="0"
maxOccurs="unbounded"/>
        </xs:sequence>
        <xs:attribute name="IP-capabilities" type="lSupportedIP" default="IPv6-only"/>
        <xs:anyAttribute/>
    </xs:complexType>
    <xs:complexType name="tAction">
        <xs:sequence>
            <xs:element name="emergency-registration" minOccurs="0" maxOccurs="1">
                <xs:complexType/>
            </xs:element>
            <xs:any namespace="##any" processContents="lax" minOccurs="0"
maxOccurs="unbounded"/>
        </xs:sequence>
        <xs:anyAttribute/>
```

TABLE 7.7A-continued

IM CN subsystem XML body, XML Schema

```
    </xs:complexType>
    <xs:element name="ims-3gpp" type="tIMS3GPP"/>
</xs:schema>
```

7.6.3 XML Schema Description
This subclause describes the elements of the IMS Document Type Definition as defined in table 7.7A.

| | |
|---|---|
| <ims-3gpp>: | This is the root element of the IMS XML body. It shall always be present. XML instance documents of future versions of the XML Schema in table 7.7A shall be valid against the XML Schema in table 7.7A in this document. XML instance documents of the XML Schema in table 7.7A in the present document shall have a version attribute value, part of the ims-3gpp element, that is equal to the value of the XML Schema version described in the present document. |
| <service-info>: | the transparent element received from the HSS for a particular trigger point are placed within this optional element. |
| <alternative-service>: | in the present document, the alternative service is used as a response for an attempt to establish an emergency session within the IM CN subsystem. The element describes an alternative service where the call should success. The alternative service is described by the type of service information. A possible reason cause why an alternative service is suggested may be included.<br>The <alternative-service> element contains a <type> element that indicates the type of alternative service and an <action> element, an optional element.<br>The <type> element contains only the value "emergency" in the present document.<br>The <action> element contains only the value "emergency-registration" in the present document.<br>The <reason> element contains an explanatory text with the reason why the session setup has been redirected. A UE may use this information to give an indication to the user.<br>The IP-capabilities attribute lists the IP-capabilities & preferences. If more than one value is present, the ordering is significant and indicated relative, decreasing preference. An empty list is to be interpreted as having no preference for any of the enumerated IP capabilities. |

In the above example, the IP-capabilities are listed as an attribute of the alternative-service element. The same field could also be an attribute of the service-info element, any other element or even a new element. Alternatively, the IP-capabilities can be implemented as XML elements themselves, see e.g. tSupportedIP in the example above.

In any of these embodiments, when a network node such as, but not limited to, a registrar, a SIP proxy node, or an S-CSCF, receives a SIP message containing a tag or other indicator indicating that two different transport addressing schemes can be used simultaneously in a session related to the SIP message, the network node can determine whether or not the signaling portion and/or the media portion of the session is routed through a translation gateway. For example, if the network node receives a SIP message indicating that a first UA supports IPv4 for media and IPv6 for signaling, and the first UA is attempting to contact a second UA that uses IPv4 for both media and signaling, the network node might route the signaling portion of the session through a translation gateway. Alternatively, if the network node receives a SIP message indicating that a first UA supports IPv6 for media and IPv4 for signaling, and the first UA is attempting to contact a second UA that uses IPv4 for both media and signaling, the network node might route the media portion of the session through a translation gateway.

FIG. 1 illustrates a portion of the components that may be present in an IMS architecture. A first UA 110 with IMS capabilities can send and receive SIP-based messages. While the previous discussion has focused on SIP sessions between two UAs, it should be understood that a single UA might concurrently sends messages to or concurrently receive messages from a plurality of other UAs. In the embodiment of FIG. 1, the other UAs are represented by a second UA 120 and a third UA 130, but in other embodiments a different number of other UAs could be present.

In an embodiment, the first UA 110 might wish to inform the second UA 120 and the third UA 130 of the transport addressing scheme or combination of schemes the first UA 110 supports. To do so, the first UA 110 sends a SIP message 140 to the second UA 120 and the third UA 130. The SIP message 140 might be a SIP INVITE or some other SIP message. The SIP message 140 can include an indicator 150 in the Contact header that is related to a transport addressing scheme. In this case, the indicator specifies at least one transport addressing scheme the first UA 110 supports.

Alternatively, the indicator 150 in the Contact header might be included in a SIP REGISTER request that the first UA 110 sends to a network node 160, such as, but not limited to, a registrar, a SIP proxy node, or an S-CSCF. Information about the transport addressing scheme that the first UA 110 supports would then be available at the network node 160 when the first UA 110 sends subsequent message to the second UA 120 and/or the third UA 130.

In another embodiment, the first UA 110 might wish to discover the transport addressing scheme or combination of schemes that the second UA 120 and the third UA 130 are using. In this case, the SIP message 140 might be a SIP OPTIONS request that follows RFC 3261, and the indicator 150 might be a portion of the SIP OPTIONS request that requests that the second UA 120 and the third UA 130 inform the first UA 110 of the transport addressing scheme or schemes that they are using. Upon receiving the SIP OPTIONS request, the second UA 120 and/or the third UA 130 can send SIP messages back to the first UA 110 that contain Contact headers that include media feature tags indicating the transport addressing scheme or schemes that the second UA 120 and/or the third UA 130 are using.

In another embodiment, the first UA 110 might wish to inform the second UA 120 and the third UA 130 of the transport addressing scheme or combination of schemes that the first UA 110 prefers that the second UA 120 and the third UA 130 use. In this case, the SIP message 140 can include an Accept-Contact header as defined in RFC 3841. The indicator 150 might be a portion of the Accept-Contact header that specifies the preferred transport addressing scheme or combination of schemes. In some embodiments, the indicator 150 indicates the same preference for both the second UA 120 and the third UA 130. In other embodiments, a first indicator 150a in a first SIP message 140a can indicate a first preference for the second UA 120, and a second indicator 150b in a second SIP message 140b can indicate a second preference for the third UA 120.

When the network node 160 receives the SIP message 140, the network node 160 can examine the indicator 150 to determine the transport addressing schemes for media and signaling that are specified by the indicator 150. The network node 160 can then determine whether or not the signaling portion and/or the media portion of the session related to the SIP message are routed through a translation gateway or other translation component.

Figure 2:
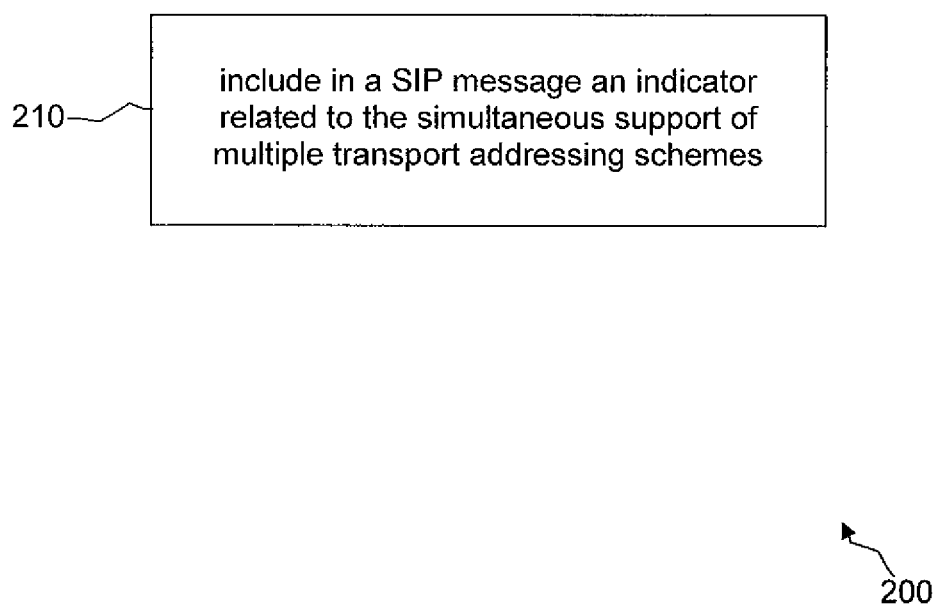
FIG. 2 is a diagram of a method for conveying information related to a transport addressing scheme according to an embodiment of the disclosure.

FIG. 2 illustrates an embodiment of a method 200 for conveying information related to a transport addressing scheme. In block 210, an indicator related to the simultaneous support of multiple transport addressing schemes is included in a SIP message.

FIG. 3 illustrates a wireless communications system including an embodiment of the UA 110. The UA 110 is operable for implementing aspects of the disclosure, but the disclosure should not be limited to these implementations. Though illustrated as a mobile phone, the UA 110 may take various forms including a wireless handset, a pager, a personal digital assistant (PDA), a portable computer, a tablet computer, or a laptop computer. Many suitable devices combine some or all of these functions. In some embodiments of the disclosure, the UA 110 is not a general purpose computing device like a portable, laptop or tablet computer, but rather is a special-purpose communications device such as a mobile phone, wireless handset, pager, or PDA. In another embodiment, the UA 110 may be a portable, laptop or other computing device. The UA 110 may support specialized activities such as gaming, inventory control, job control, and/or task management functions, and so on.

The UA 110 includes a display 402. The UA 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 110 may present options for the user to select, controls for the user to actuate, and/or cursors or other indicators for the user to direct. The UA 110 may further accept data entry from the user, including numbers to dial or various parameter values for configuring the operation of the UA 110. The UA 110 may further execute one or more software or firmware applications in response to user commands. These applications may configure the UA 110 to perform various customized functions in response to user interaction. Additionally, the UA 110 may be programmed and/or configured over-the-air, for example from a wireless base station, a wireless access point, or a peer UA 110.

Among the various applications executable by the UA 110 are a web browser, which enables the display 402 to show a web page. The web page may be obtained via wireless communications with a wireless network access node, a cell tower, a peer UA 110, or any other wireless communication network or system 400. The network 400 is coupled to a wired network 408, such as the Internet. Via the wireless link and the wired network, the UA 110 has access to information on various servers, such as a server 410. The server 410 may provide content that may be shown on the display 402. Alternately, the UA 110 may access the network 400 through a peer UA 110 acting as an intermediary, in a relay type or hop type of connection.

FIG. 4 shows a block diagram of the UA 110. While a variety of known components of UAs 110 are depicted, in an embodiment a subset of the listed components and/or additional components not listed may be included in the UA 110. The UA 110 includes a digital signal processor (DSP) 502 and a memory 504. As shown, the UA 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UA 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UA 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UA 110 to send and receive information from a cellular network or some other available wireless communications network or from a peer UA 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/ demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UA 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UA 110 and may also enable the UA 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UA 110 to communicate wirelessly with other nearby UAs and/or wireless base stations.

The input/output interface 518 may further connect the DSP 502 to the alert 526 that, when triggered, causes the UA 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UA 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UA 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UA 110 to determine its position. Various other peripherals may also be included to provide additional functions, e.g., radio and television reception.

FIG. 5 illustrates a software environment 602 that may be implemented by the DSP 502. The DSP 502 executes operating system drivers 604 that provide a platform from which the rest of the software operates. The operating system drivers 604 provide drivers for the node hardware with standardized interfaces that are accessible to application software. The operating system drivers 604 include application management services ("AMS") 606 that transfer control between applications running on the UA 110. Also shown in FIG. 5 are a web browser application 608, a media player application 610, and Java applets 612. The web browser application 608 configures the UA 110 to operate as a web browser, allowing a user to enter information into forms and select links to retrieve and view web pages. The media player application 610 configures the UA 110 to retrieve and play audio or audiovisual media. The Java applets 612 configure the UA 110 to provide games, utilities, and other functionality. A component 614 might provide functionality described herein.

Figure 6:
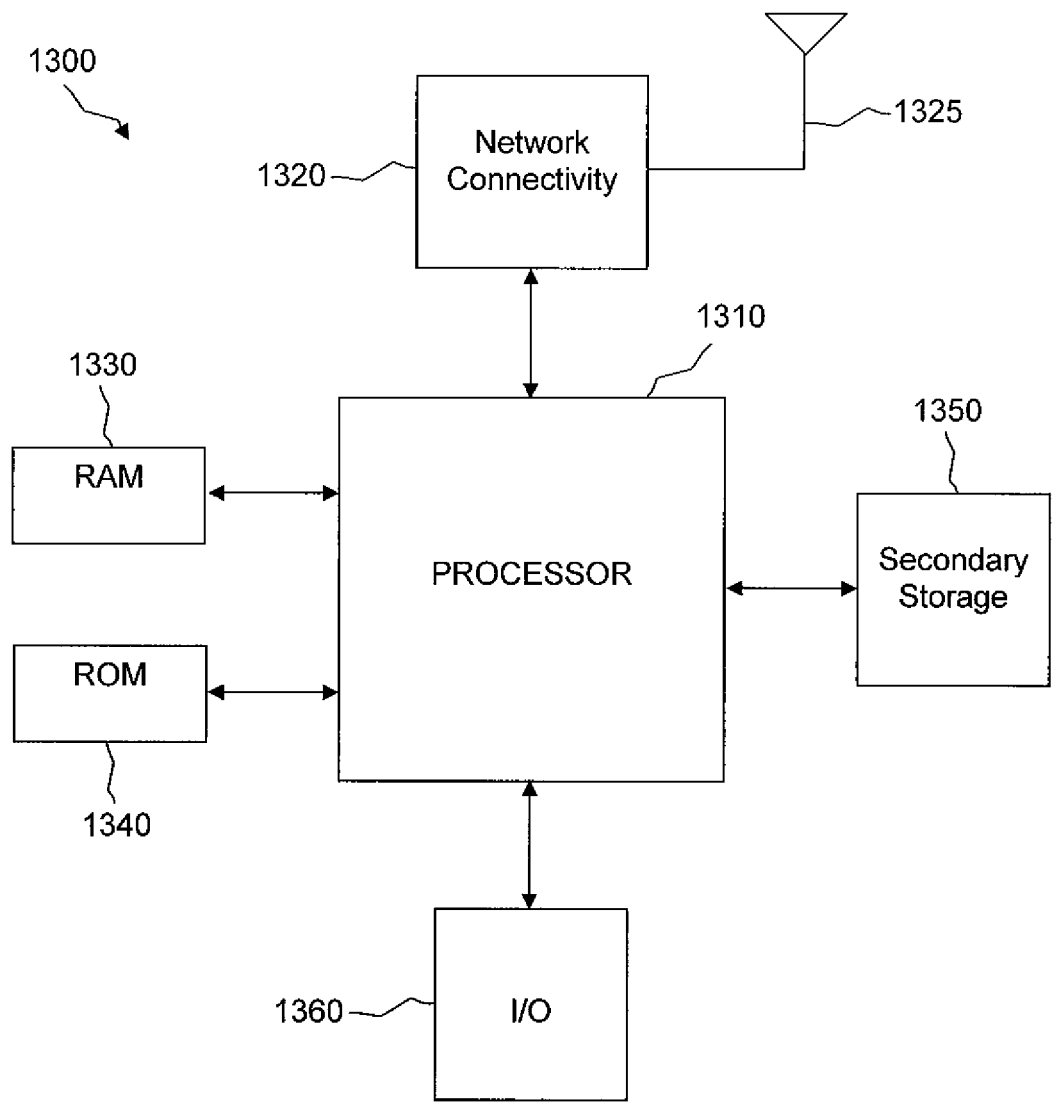
FIG. 6 illustrates a processor and related components suitable for implementing the several embodiments of the present disclosure.

The UA 110 and other components described above might include a processing component that is capable of executing instructions related to the actions described above. FIG. 6 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UA 110, such as the display 402 and the input 404.

The following 3rd Generation Partnership Project (3GPP) Technical Specification (TS) is incorporated herein by reference: TS 24.229 V7.8.0 (2007-12). Also incorporated herein by reference is "SIP: Session Initiation Protocol", RFC 3261, June 2002, and RFC 3840, RFC 3841, and RFC 3261.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for conveying information related to a transport addressing scheme, comprising:
   including, by a user agent (UA) comprising a processor, in a Session Initiation Protocol (SIP) message an indicator that indicates whether the UA is capable or not capable of simultaneously supporting multiple transport addressing schemes for communication during at least one communication session, wherein the indicator further indicates that a first of the multiple transport addressing schemes is used for signaling and that a second of the multiple transport addressing schemes is used for media, wherein the multiple transport addressing schemes are IPv4 and IPv6, wherein the indicator conveys at least one of:
   at least one transport addressing scheme used by a first user agent (UA) attempting to establish contact with a second UA;
   a request from the first UA for the second UA to inform the first UA of at least one transport addressing scheme supported by the second UA; and
   a specification of at least one transport addressing scheme that the first UA prefers that the second UA use.

2. The method of claim 1, wherein the indicator is one of:
   a media feature tag;

a SIP header field; and an extensible markup language (XML) body.

3. The method of claim 2, wherein, when the first UA is attempting to establish contact with the second UA, and when the indicator is the media feature tag, at least one token is associated with the media feature tag, the at least one token specifying at least one of:

a transport addressing scheme for signaling;

a transport addressing scheme for media; and a transport addressing scheme for both signaling and media.

4. The method of claim 3, wherein the media feature tag usage follows specifications in one of:

Internet Engineering Task Force (IETF) Request for Comments (RFC) 3840; and

IETF RFC 3841.

5. The method of claim 3, wherein the media feature tag is included in a Contact header of an initial SIP request.

6. The method of claim 3, wherein a first set of tokens applies to a first network access technology and a second set of tokens applies to a second network access technology.

7. The method of claim 2, wherein, when the first UA requests the second UA to inform the first UA of at least one addressing scheme used by the second UA, the second UA sends the first UA a media feature tag that includes at least one token specifying at least one addressing scheme used by the second UA for at least one of:

signaling;

media; and both signaling and media.

8. The method of claim 7, wherein the first UA requests the second UA to inform the first UA of at least one addressing scheme used by the second UA by sending a SIP OPTIONS request that follows specifications in IETF RFC 3261.

9. The method of claim 8, wherein the second UA includes the media feature tag in a Contact header of a message sent to the first UA in response to the SIP OPTIONS request.

10. The method of claim 2, wherein, when the first UA specifies the at least one transport addressing scheme that the first UA prefers that the second UA use, the first UA specifies the preference by sending the second UA a media feature tag that includes at least one token specifying at least one of:

a preferred transport addressing scheme for signaling;

a preferred transport addressing scheme for media; and a preferred transport addressing scheme for both signaling and media.

11. The method of claim 10, wherein the preferred transport addressing scheme is at least one of:

IPv4; and

IPv6.

12. The method of claim 10, wherein the first UA specifies the at least one transport addressing scheme that the first UA prefers that the second UA use by including the preference in an Accept-Contact header that follows specifications in IETF RFC 3841.

13. A user agent (UA) configured to convey information related to a transport addressing scheme, comprising:

a processor configured to include in a Session Initiation Protocol (SIP) message an indicator that indicates whether the UA is capable or not capable of simultaneously supporting multiple transport addressing schemes for communication during at least one communication session, wherein the indicator further indicates that a first of the multiple transport addressing schemes is used for signaling and that a second of the multiple transport addressing schemes is used for media, wherein the multiple transport addressing schemes are IPv4 and IPv6, wherein the indicator conveys one of:

at least one transport addressing scheme used by the UA;

a request from the UA for a second UA to inform the UA of at least one transport addressing scheme supported by the second UA; and a specification of at least one transport addressing scheme that the UA prefers that the second UA use.

14. The UA of claim 13 wherein the indicator is one of:

a media feature tag;

a SIP header filed; and an extensible markup language (XML) body.

15. The UA of claim 14, wherein, when the UA is attempting to establish contact with the second UA, and when the indicator is the media feature tag, at least one token is associated with the media feature tag, the at least one token specifying at least one of:

a transport addressing scheme the UA is using for signaling;

a transport addressing scheme the UA is using for media; and a transport addressing scheme the UA is using for both signaling and media.

16. The UA of claim 15, wherein the media feature tag usage follows specifications in one of:

Internet Engineering Task Force (IETF) Request for Comments (RFC) 3840; and

IETF RFC 3841.

17. The UA of claim 15, wherein the media feature tag is included in a Contact header of an initial SIP request.

18. The UA of claim 15, wherein a first set of tokens applies to a first network access technology and a second set of tokens applies to a second network access technology.

19. The UA of claim 14, wherein, when the UA requests the second UA to inform the UA of at least one addressing scheme used by the second UA, the second UA sends the UA a media feature tag that includes at least one token specifying at least one addressing scheme used by the second UA for at least one of:

signaling;

media; and both signaling and media.

20. The UA of claim 19, wherein the UA requests the second UA to inform the UA of at least one addressing scheme used by the second UA by sending a SIP OPTIONS request that follows specifications in IETF RFC 3261.

21. The UA of claim 20, wherein the second UA includes the media feature tag in a Contact header of a message sent to the UA in response to the SIP OPTIONS request.

22. The UA of claim 14, wherein, when the UA specifies the at least one transport addressing scheme that the UA prefers that the second UA use, the UA specifies the preference by sending the second UA a media feature tag that includes at least one token specifying at least one of:

a preferred transport addressing scheme for signaling;

a preferred transport addressing scheme for media; and a preferred transport addressing scheme for both signaling and media.

23. The UA of claim 22, wherein the UA specifies the at least one transport addressing scheme that the UA prefers that the second UA use by including the preference in an Accept-Contact header that follows specifications in IETF RFC 3841.

24. The method of claim 1, wherein the UA being capable of simultaneously supporting multiple transport addressing schemes during the at least one communication session is defined as the UA being capable of using a first transport address scheme at the same time as using a second transport address scheme.

25. The UA of claim 13, wherein the UA being capable of simultaneously supporting multiple transport addressing schemes during the at least one communication session is defined as the UA being capable of using a first transport address scheme at the same time as using a second transport address scheme.

* * * * *